United States Patent
Iwayama et al.

(10) Patent No.: US 11,507,755 B2
(45) Date of Patent: Nov. 22, 2022

(54) INFORMATION PROCESSING METHOD AND INFORMATION PROCESSING APPARATUS

(71) Applicant: Hitachi, Ltd., Tokyo (JP)

(72) Inventors: Makoto Iwayama, Tokyo (JP); Yu Asano, Tokyo (JP)

(73) Assignee: HITACHI, LTD., Tokyo (JP)

( * ) Notice: Subject to any disclaimer, the term of this patent is extended or adjusted under 35 U.S.C. 154(b) by 304 days.

(21) Appl. No.: 16/809,903

(22) Filed: Mar. 5, 2020

(65) Prior Publication Data

US 2021/0089722 A1    Mar. 25, 2021

(30) Foreign Application Priority Data

Sep. 25, 2019 (JP) ................................ 2019-174274

(51) Int. Cl.
| G06F 40/35 | (2020.01) |
|---|---|
| G06N 5/04 | (2006.01) |
| G06F 17/16 | (2006.01) |
| G06F 40/247 | (2020.01) |

(52) U.S. Cl.
CPC .............. *G06F 40/35* (2020.01); *G06F 17/16* (2013.01); *G06F 40/247* (2020.01); *G06N 5/04* (2013.01)

(58) Field of Classification Search
CPC ........ G06F 40/00; G06F 40/35; G06F 40/247; G06F 17/00; G06F 17/16; G06N 5/00; G06N 5/04

See application file for complete search history.

(56) References Cited

U.S. PATENT DOCUMENTS

| 10,019,513 B1* | 7/2018 | Koren ................. G06F 16/3344 |
|---|---|---|
| 2009/0100053 A1* | 4/2009 | Boschee ............... G06F 16/334 |
| 2013/0031122 A1* | 1/2013 | Riezler ............... G06F 16/3338 |
| | | 707/760 |
| 2014/0222743 A1* | 8/2014 | Baughman ............... G06N 5/02 |
| | | 706/46 |
| 2015/0006157 A1* | 1/2015 | Andrade Silva ...... G06F 40/247 |
| | | 704/9 |
| 2015/0074095 A1* | 3/2015 | Enders .................... G06F 40/40 |
| | | 707/728 |
| 2016/0283468 A1* | 9/2016 | Mueller .................. G06F 40/40 |
| 2019/0163781 A1* | 5/2019 | Ackermann ...... G06F 16/24578 |

FOREIGN PATENT DOCUMENTS

JP    2018-197924 A    12/2018

* cited by examiner

*Primary Examiner* — Daniel C Washburn
*Assistant Examiner* — Sean E Serraguard
(74) *Attorney, Agent, or Firm* — Mattingly & Malur, PC

(57) ABSTRACT

An information processing apparatus has an inference unit with a first function of inputting first text data including a set of a first question text and a first answer text, and second text data including a set of a second question text and a second answer text; and a second function of, in a case in which a first synonym relationship in which a word a in the first text data is capable of being substituted with a word b is established and a second synonym relationship in which the word a in the second text data is capable of being substituted with a word c is established. A similarity between the word b and the word c is calculated from a first similarity between the first answer text and the second answer text and a second similarity between the first question text and the second question text.

11 Claims, 19 Drawing Sheets

F I G. 1
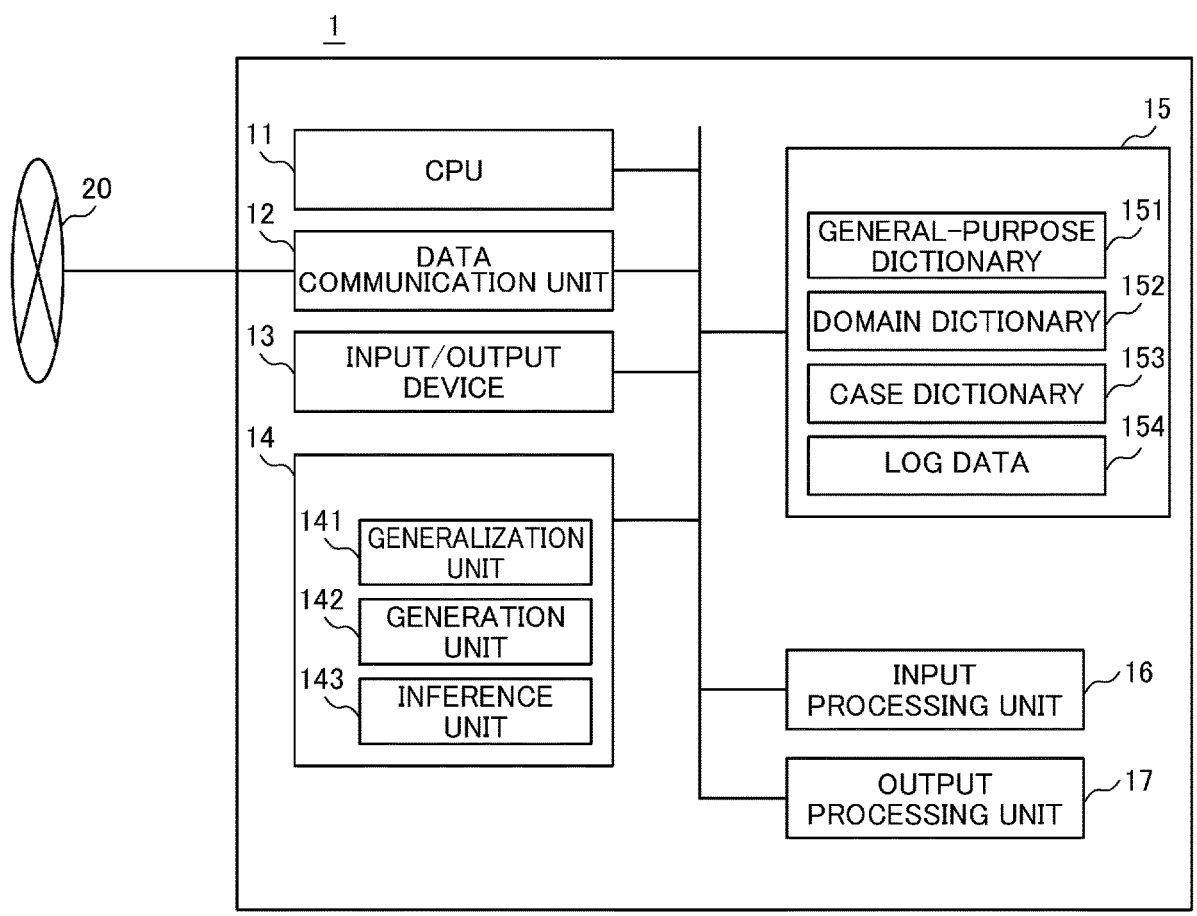

| DIALOGUE ID | ANSWER TEXT | ANSWER TEXT |
|---|---|---|
| d1 | LET ME KNOW LOCATION OF <ELEVATOR> | ELEVATOR IS LOCATED NEXT TO TOILET ON NORTH SIDE ON EACH FLOOR. |
|  | I WANT TO USE <ELEVATOR>. |  |
| d2 | LET ME KNOW LOCATION OF CHILD <CARE ROOM> | CHILD CARE ROOM IS LOCATED NEXT TO STAIRCASE ON THIRD FLOOR. |

| DOMAIN | HEADWORD | SYNONYM | | |
|---|---|---|---|---|
| FINANCE | <HOUSE> | HOUSE | HOME | HOUSING |
| FINANCE | <ELEVATOR> | ELEVATOR | ELEVATING DEVICE | LIFT |
| FINANCE | <REST ROOM> | REST ROOM | REST AREA |  |
| FINANCE | <APPLICATION> | APPLICATION | NOTIFICATION | SUBMISSION |

| DOMAIN | CASE | HEADWORD | SYNONYM | | |
|---|---|---|---|---|---|
| PUBLIC | A OFFICE | <HOUSE> | HOUSE | HOME | HOUSING |
| PUBLIC | A OFFICE | <ELEVATOR> | ELEVATOR | ELEVATING DEVICE | LIFT |
| PUBLIC | A OFFICE | <REST ROOM> | REST ROOM | REST STATION |  |
| PUBLIC | A OFFICE | <APPLICATION> | APPLICATION | NOTIFICATION | SUBMISSION |

FIG. 7

| DOMAIN | | |
|---|---|---|
| FINANCE | | |

703 ◁ ⟨ELEVATOR⟩ ▷ 704

| WORD | EVALUATION | |
|---|---|---|
| ELEVATOR | True | |
| ELEVATING DEVICE | True | |
| FACILITY | False | |

| QUESTION TEXT | ANSWER TEXT | DOMAIN | SCORE | EVALUATION |
|---|---|---|---|---|
| LET ME KNOW LOCATION OF ⟨ELEVATOR⟩ | ELEVATOR IS LOCATED NEXT TO TOILET ON NORTH SIDE ON EACH FLOOR | D BANK | 0.95 | |
| I WANT TO USE ⟨ELEVATOR⟩. | ELEVATOR IS LOCATED NEXT TO TOILET ON NORTH SIDE ON EACH FLOOR | D BANK | 0.48 | |
| | | | | |
| | | | | |
| | | | | |

FIG. 8A

| 154 DICTIONARY 801 | TIME 802 | USER ID 803 | HEADWORD 804 | SYNONYM 805 | QUESTION TEXT 806 | ANSWER TEXT 807 | EVALUATION 808 | CLASSIFICATION 809 |
|---|---|---|---|---|---|---|---|---|
| FINANCE | 2019/1/2 15:32:22 | 1123 | ELEVATOR | ELEVATOR | LET ME KNOW LOCATION OF ⟨ELEVATOR⟩ | ELEVATOR IS LOCATED NEXT TO TOILET ON NORTH SIDE ON EACH FLOOR. | True | APPLICATION |
| FINANCE | 2019/1/2 15:32:22 | 1123 | ELEVATOR | ELEVATOR | I WANT TO USE ⟨ELEVATOR⟩ | ELEVATOR IS LOCATED NEXT TO TOILET ON NORTH SIDE ON EACH FLOOR. | True | APPLICATION |
| FINANCE | 2019/1/2 15:32:22 | 1123 | ELEVATOR | ELEVATING DEVICE | LET ME KNOW LOCATION OF ⟨ELEVATOR⟩ | ELEVATOR IS LOCATED NEXT TO TOILET ON NORTH SIDE ON EACH FLOOR. | True | APPLICATION |
| FINANCE | 2019/1/2 15:32:22 | 1123 | ELEVATOR | ELEVATING DEVICE | I WANT TO USE ⟨ELEVATOR⟩ | ELEVATOR IS LOCATED NEXT TO TOILET ON NORTH SIDE ON EACH FLOOR. | True | APPLICATION |
| FINANCE | 2019/1/2 15:32:22 | 1123 | ELEVATOR | FACILITY | LET ME KNOW LOCATION OF ⟨ELEVATOR⟩ | ELEVATOR IS LOCATED NEXT TO TOILET ON NORTH SIDE ON EACH FLOOR. | False | APPLICATION |
| FINANCE | 2019/1/2 15:32:22 | 1123 | ELEVATOR | FACILITY | I WANT TO USE ⟨ELEVATOR⟩ | ELEVATOR IS LOCATED NEXT TO TOILET ON NORTH SIDE ON EACH FLOOR. | False | APPLICATION |

FIG. 8B

| 154 | | | | | | | | |
|---|---|---|---|---|---|---|---|---|
| DICTIONARY | TIME | USER ID | HEADWORD | SYNONYM | QUESTION TEXT | ANSWER TEXT | EVALUATION | CLASSIFICATION |
| FINANCE | 2019/7/10 15:12:42 | 9012 | APPLICATION | APPLICATION | WHICH DOCUMENTS ARE REQUIRED FOR <APPLICATION>? | DOCUMENT REQUIRED FOR APPLICATION IS PERSONAL CERTIFICATE. | True | GENERALIZING |
| FINANCE | 2019/7/10 15:12:42 | 9012 | APPLICATION | APPLICATION | WHERE CAN I GO FOR APPLICATION? | YOU CAN SUBMIT APPLICATION AT WINDOW NO. 1. | True | GENERALIZING |
| FINANCE | 2019/7/10 15:12:42 | 9012 | APPLICATION | NOTIFICATION | WHICH DOCUMENTS ARE REQUIRED FOR <APPLICATION>? | DOCUMENT REQUIRED FOR APPLICATION IS PERSONAL CERTIFICATE. | True | GENERALIZING |
| FINANCE | 2019/7/10 15:12:42 | 9012 | APPLICATION | NOTIFICATION | WHERE CAN I GO FOR APPLICATION? | YOU CAN SUBMIT APPLICATION AT WINDOW NO. 1. | True | GENERALIZING |
| FINANCE | 2019/7/10 15:12:42 | 9012 | APPLICATION | SUBMISSION | WHICH DOCUMENTS ARE REQUIRED FOR <APPLICATION>? | DOCUMENT REQUIRED FOR APPLICATION IS PERSONAL CERTIFICATE. | False | GENERALIZING |
| FINANCE | 2019/7/10 15:12:42 | 9012 | APPLICATION | SUBMISSION | WHERE CAN I GO FOR APPLICATION? | YOU CAN SUBMIT APPLICATION AT WINDOW NO. 1. | False | GENERALIZING |

FIG. 8C

| DICTIONARY | TIME | USER ID | HEADWORD | SYNONYM | QUESTION TEXT | ANSWER TEXT | EVALUATION | CLASSIFICATION |
|---|---|---|---|---|---|---|---|---|
| TAX | 2019/7/10 15:12:42 | 9012 | CAR REGISTRATION NUMBER | CAR REGISTRATION NUMBER | n/a | n/a | True | EXPANSION |
| TAX | 2019/7/10 15:12:42 | 9012 | CAR REGISTRATION NUMBER | NUMBER PLATE | n/a | n/a | True | EXPANSION |
| CAR | 2019/7/10 15:12:42 | 9012 | CAR REGISTRATION NUMBER | CAR REGISTRATION NUMBER | n/a | n/a | True | EXPANSION |
| CAR | 2019/7/10 15:12:42 | 9012 | CAR REGISTRATION NUMBER | NUMBER PLATE | n/a | n/a | True | EXPANSION |
| BANK | 2019/7/10 15:12:42 | 9012 | MY NUMBER | MY NUMBER | n/a | n/a | True | EXPANSION |
| BANK | 2019/7/10 15:12:42 | 9012 | MY NUMBER | PERSONAL NUMBER | n/a | n/a | True | EXPANSION |
| SECURITY | 2019/7/10 15:12:42 | 9012 | MY NUMBER | MY NUMBER | n/a | n/a | True | EXPANSION |
| SECURITY | 2019/7/10 15:12:42 | 9012 | MY NUMBER | PERSONAL NUMBER | n/a | n/a | True | EXPANSION |

FIG. 8D

| 154 | 801 | 802 | 803 | 804 | 805 | 806 | 807 | 808 | 809 |
|---|---|---|---|---|---|---|---|---|---|
| | DICTIONARY | TIME | USER ID | HEADWORD | SYNONYM | QUESTION TEXT | ANSWER TEXT | EVALUATION | CLASSIFIED AS |
| | D BANK | 2019/7/11 20:17:30 | 0023 | APPLICATION | APPLICATION | WHICH DOCUMENTS ARE REQUIRED FOR <APPLICATION>? | DOCUMENT REQUIRED FOR APPLICATION IS PERSONAL CERTIFICATE. | True | APPLICATION |
| | D BANK | 2019/7/11 20:17:30 | 0023 | APPLICATION | NOTIFICATION | WHICH DOCUMENTS ARE REQUIRED FOR <APPLICATION>? | DOCUMENT REQUIRED FOR APPLICATION IS PERSONAL CERTIFICATE. | False | APPLICATION |
| | D BANK | 2019/7/11 20:17:30 | 0023 | APPLICATION | SUBMISSION | WHICH DOCUMENTS ARE REQUIRED FOR <APPLICATION>? | DOCUMENT REQUIRED FOR APPLICATION IS PERSONAL CERTIFICATE. | False | APPLICATION |
| | D BANK | 2019/7/11 20:17:30 | 0023 | APPLICATION | DECLARATION | WHICH DOCUMENTS ARE REQUIRED FOR <APPLICATION>? | DOCUMENT REQUIRED FOR APPLICATION IS PERSONAL CERTIFICATE. | True | APPLICATION |

F I G. 1 1

| HEADWORD | SYNONYM | EVALUATION RESULT (SUM TOTAL) | EVALUATION RESULT (TRUE) | EVALUATION RESULT (FALSE) | CASE | DOMAIN |
|---|---|---|---|---|---|---|
| <HOUSE> | HOUSE | True | 7 | 0 | B BANK | FINANCE |
| <HOUSE> | FACTORY | False | 1 | 6 | B BANK | FINANCE |
| <HOUSE> | HOME | True | 5 | 2 | B BANK | FINANCE |

| HEADWORD | SYNONYM | EVALUATION RESULT (SUM TOTAL) | EVALUATION RESULT (TRUE) | EVALUATION RESULT (FALSE) | CASE | DOMAIN |
|---|---|---|---|---|---|---|
| <HOUSE> | HOUSE | True | 7 | 0 | C BANK | FINANCE |
| <HOUSE> | FACTORY | True | 10 | 3 | C BANK | FINANCE |
| <HOUSE> | HOME | True | 4 | 1 | C BANK | FINANCE |

FIG. 12

| DOMAIN | | |
|---|---|---|
| FINANCE | | |

701

703 <APPLICATION> 702 704

| WORD | EVALUATION |
|---|---|
| APPLICATION | True |
| NOTIFICATION | True |
| SUBMISSION | False |
| | |
| | |

705  706

| QUESTION TEXT 707 | ANSWER TEXT 708 | DOMAIN 709 | SCORE 710 | EVALUATION 711 |
|---|---|---|---|---|
| WHICH DOCUMENTS ARE REQUIRED FOR <APPLICATION>? | DOCUMENT REQUIRED FOR APPLICATION IS PERSONAL CERTIFICATE. | A BANK | | |
| WHERE CAN I GO FOR <APPLICATION>? | YOU CAN SUBMIT APPLICATION AT WINDOW NO. 1. | B BANK | | |
| | | | | |
| | | | | |
| | | | | |

152

| DOMAIN | HEADWORD | SYNONYM | |
|---|---|---|---|
| PUBLIC | <HOUSE> | HOUSE | HOME |
| PUBLIC | <ELEVATOR> | ELEVATOR | ELEVATING DEVICE |
| PUBLIC | <HOME> | HOME | HOUSING |

FIG. 15

| DOMAIN | HEADWORD | SYNONYM | | |
|---|---|---|---|---|
| PUBLIC | \<HOUSE\> | HOUSE | HOME | LIVING PLACE |
| PUBLIC | \<ELEVATOR\> | ELEVATOR | ELEVATING DEVICE | |
| PUBLIC | \<HOME\> | HOME | HOUSING | |

FIG. 16

DIALOGUE DATA 1

| ID | QUESTION TEXT | ANSWER TEXT |
|---|---|---|
| 1 | q11 | a11 |
| ... | ... | ... |
| i | q1i | a1i |
| ... | ... | ... |
| n | q1n | a1n |

SYNONYM DATA OF DIALOGUE DATA 1

| HEADWORD | SYNONYM | |
|---|---|---|
| ... | ... | ... |
| \<e1\> | syn11 | syn12 |
| ... | ... | ... |

DIALOGUE DATA 2

| ID | QUESTION TEXT | ANSWER TEXT |
|---|---|---|
| 1 | q21 | a21 |
| ... | ... | ... |
| j | q2j | a2j |
| ... | ... | ... |
| m | q2m | a2m |

SYNONYM DATA OF DIALOGUE DATA 2

| HEADWORD | SYNONYM | |
|---|---|---|
| ... | ... | ... |
| \<e2\> | syn11 | syn22 |
| ... | ... | ... |

F I G. 17

| | DOMAIN | DEFINITION OF SYNONYM | QUESTION TEXT | ANSWER TEXT |
|---|---|---|---|---|
| 1 | TAX | NUMBER = CAR REGISTRATION NUMBER | I WANT CERTIFICATE OF TAX PAYMENT IN OTHER PROVINCES (Q1) | APPLICATION IS LIMITED TO NUMBERS IN PREFECTURE. PLEASE ASK PREFECTURE WHERE NUMBER WAS REGISTERED ON APRIL 1 OF YEAR WHEN YOU RECEIVED CAR EXAMINATION. (A1) |
| 2 | CAR | NUMBER = NUMBER PLATE | WHAT IS NEEDED TO CHANGE DESIRED <NUMBER>? (Q2) | IN ADDITION TO CONTACT ADDRESS, INFORMATION, SUCH AS TYPE AND STATE OF CAR, IS NEEDED. (A2)2) |
| 3 | BANK | NUMBER = MY NUMBER | IS <NUMBER> NEEDED TO CHANGE ADDRESS OF ACCOUNT? (Q3) | "MY NUMBER" WHOSE RECEPTION STARTED FROM OCTOBER, 2015 IS NEEDED TO CHANGE ADDRESS OF ACCOUNT. (A3) |
| 4 | SECURITY | NUMBER = PERSONAL NUMBER | IS <NUMBER> NEEDED TO CHANGE NAME OF ACCOUNT HOLDER? (Q4) | PLEASE BRING PERSONAL CERTIFICATE, SUCH AS LICENSE OR MY NUMBER CARD, IN ORDER TO CHANGE NAME OF ACCOUNT HOLDER. (A4) |

F I G. 1 8

| SIMILARITY OF Q | | SIMILARITY OF A | | DETERMINATION OF SYNONYM |
|---|---|---|---|---|
| Q1-Q2 | LOW | A1-A2 | HIGH | ○ |
| Q1-Q3 | LOW | A1-A3 | LOW | × |
| Q1-Q4 | LOW | A1-A4 | LOW | × |
| Q2-Q3 | HIGH | A2-A3 | LOW | × |
| Q2-Q4 | HIGH | A2-A4 | LOW | × |
| Q3-Q4 | HIGH | A3-A4 | HIGH | ○ |

F I G. 2 0
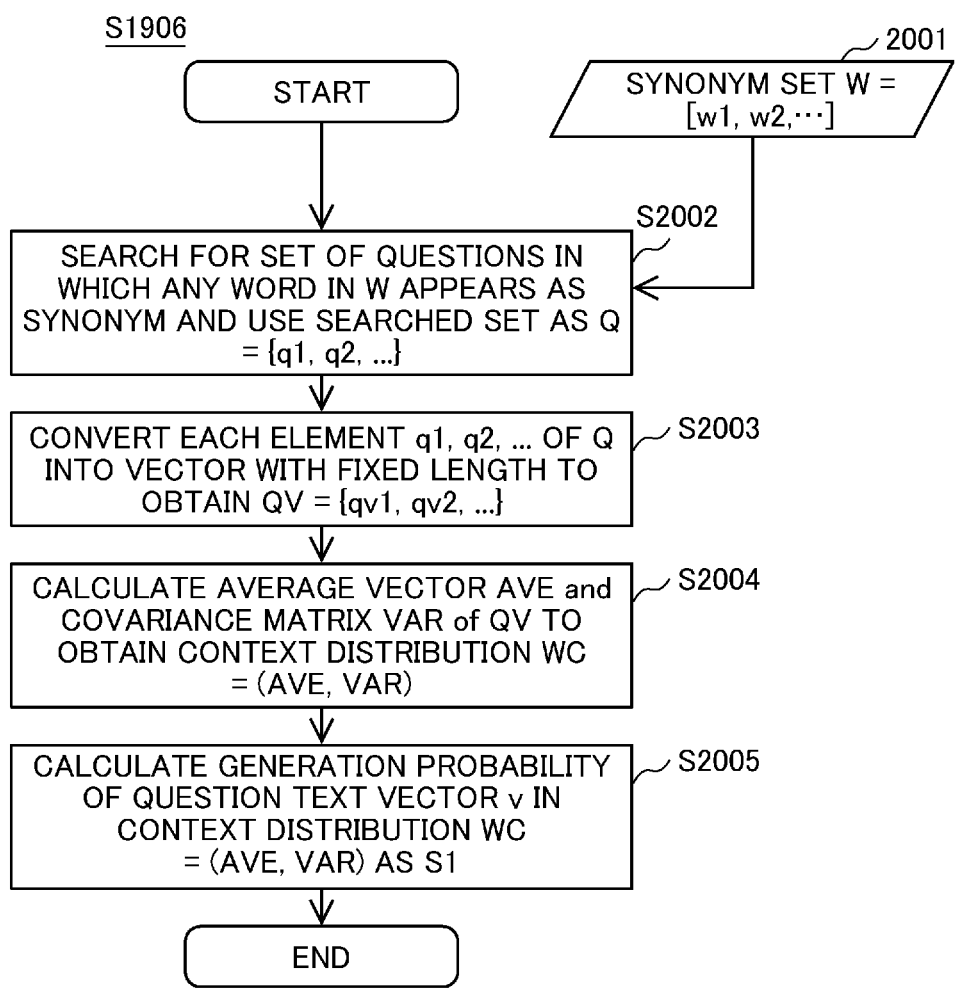

FIG. 21

| DOMAIN | | | |
|---|---|---|---|
| TAX SERVICE 701 | | | |

⟨APPLICATION⟩ 703 — 702 △ 704

| WORD | EVALUATION |
|---|---|
| APPLICATION | True |
| NOTIFICATION | False |
| SUBMISSION | False |
| DECLARATION | |

705   706

| | 707 | 708 | 709 | 710 | 711 |
|---|---|---|---|---|---|
| | QUESTION TEXT | ANSWER TEXT | DOMAIN | SCORE | EVALUATION |
| | WHICH DOCUMENTS ARE REQUIRED FOR ⟨APPLICATION⟩? | DOCUMENT REQUIRED FOR APPLICATION IS PERSONAL CERTIFICATE. | D BANK | 0.9 | True |
| | WHERE CAN I GO FOR ⟨APPLICATION⟩? | YOU CAN SUBMIT APPLICATION AT WINDOW NO. 1. | D BANK | 0.8 | False |

INFORMATION PROCESSING METHOD AND INFORMATION PROCESSING APPARATUS

CROSS-REFERENCE TO RELATED APPLICATION

The present application claims priority from Japanese application JP2019-174274, filed on Sep. 25, 2019, the contents of which is hereby incorporated by reference into this application.

BACKGROUND OF THE INVENTION

1. Field of the Invention

The present invention relates to a knowledge database (DB) that is used for a natural language dialogue system or the like.

2. Description of the Related Art

In recent years, a technique has been examined which supports the existing work of staff using a dialogue system in interpersonal services, such as facility guidance at airports and train stations where various languages are required and window services at banks or local governments that handle complex services. As a specific example, dialogue systems, such as robots and voice assistants, have been into practical use in order to support advanced service operations.

It is necessary to prepare a knowledge DB for dialogue in advance in order to achieve a dialogue system that can respond to various utterances from the users. Until now, in many cases, the knowledge DB has been manually generated and the task is to reduce costs.

For example, it is assumed that a question-answer pair of a question "Please let me know business hours" and an answer "Business hours are from 10 a.m. to 8 p.m." is prepared in order to answer the business hours of a certain store. However, there is a possibility that the user of the dialogue system will ask in various ways, such as "I want to know the sales time" or "I want to know the opening hour", and it is necessary to respond to these questions.

The dialogue systems according to the related art maintain knowledge by using the existing synonyms or paraphrase dictionaries or by creating the original dictionaries. Since it costs a lot to prepare the dictionary for each case, there is a need for a method that efficiently increases synonyms and paraphrases.

For example, JP 2018-197924 A discloses an information processing apparatus that outputs an answer to a question from a user to interact with the user in order to enable interaction without preparing large-scale paraphrase text data. The information processing apparatus includes an input unit that receives a question and a dialogue control unit that performs a confirmation process of selecting an answer candidate to the question received by the input unit in the dialogue from candidate data and confirming to the user whether or not the paraphrase of the question is appropriate and registers the candidate as a paraphrase for the question on the basis of the result of the confirmation process.

SUMMARY OF THE INVENTION

In JP 2018-197924 A, the confirmation process is performed to confirm to the user whether or not the paraphrase of the question is appropriate and it is determined whether or not the candidate is appropriate as the paraphrase for the question on the basis of the confirmation process. However, it is desirable to reduce the burden on the user as much as possible.

Therefore, there is a need for a technique that automatically determines whether or not a paraphrase is appropriate with high accuracy.

According to a preferred aspect of the invention, there is provided an information processing method that is performed in an information processing apparatus including an input device, an output device, a processing device, a storage device, and an inference unit. The inference unit performs: a first step of inputting first text data including a set of a first question text and a first answer text and second text data including a set of a second question text and a second answer text; and a second step of, in a case in which a first synonym relationship in which a word a in the first text data is capable of being substituted with a word b is established and a second synonym relationship in which the word a in the second text data is capable of being substituted with a word c is established, calculating a similarity between the word b and the word c from a first similarity between the first answer text and the second answer text and a second similarity between the first question text and the second question text. A contribution rate of the first similarity is different from a contribution rate of the second similarity in the calculation.

According to another preferred aspect of the invention, there is provided an information processing apparatus including an input device, an output device, a processing device, a storage device, and an inference unit. The inference unit has: a first function of inputting first text data including a set of a first question text and a first answer text and second text data including a set of a second question text and a second answer text; and a second function of, in a case in which a first synonym relationship in which a word a in the first text data is capable of being substituted with a word b is established and a second synonym relationship in which the word a in the second text data is capable of being substituted with a word c is established, calculating a similarity between the word b and the word c from a first similarity between the first answer text and the second answer text and a second similarity between the first question text and the second question text. A contribution rate of the first similarity is different from a contribution rate of the second similarity in the calculation.

It is possible to automatically determine whether or not a paraphrase is appropriate with high accuracy.

BRIEF DESCRIPTION OF THE DRAWINGS

FIG. 1 is a block diagram illustrating a hardware configuration of a knowledge bank 1;

FIG. 4 is a table showing an example of dialogue data 301;

FIG. 5 is a table showing an example of a synonym list in a domain dictionary 152;

FIG. 6 is a table showing an example of a synonym list in a case dictionary 153;

FIG. 7 is a diagram illustrating an input screen that is displayed on a display device of an input/output device 13 for evaluation;

FIG. 8A is a table showing an example of a data format recorded on log data 154;

FIG. 8B is a table showing an example of a data format recorded on the log data 154;

FIG. 8C is a table showing an example of a data format recorded on the log data 154;

FIG. 8D is a table showing an example of a data format recorded on the log data 154;

FIG. 11 is a table describing the concept of counting;

FIG. 12 is a diagram illustrating an input screen that is displayed on the display device of the input/output device 13 for evaluation;

FIG. 15 is a table showing another example of the public knowledge domain dictionary 152;

FIG. 16 is a table showing an example of dialogue data 1, dialogue data 2, synonym data of the dialogue data 1, and synonym data of the dialogue data 2;

FIG. 17 is a table for describing that the similarity of an answer text is more correlated with the determination of whether or not a synonym candidate is a synonym than the similarity of a question text;

FIG. 18 is a table showing a relationship between the similarity of a question text, the similarity of an answer text, and synonym determination;

FIG. 20 is a detailed flowchart illustrating the calculation of a score S1 (S1906); and FIG. 21 is a diagram illustrating a screen on which the result of an application process S1900 is displayed on the input/output device 13 and which allows the user to make an evaluation.

DETAILED DESCRIPTION OF THE PREFERRED EMBODIMENTS

Figure 2:
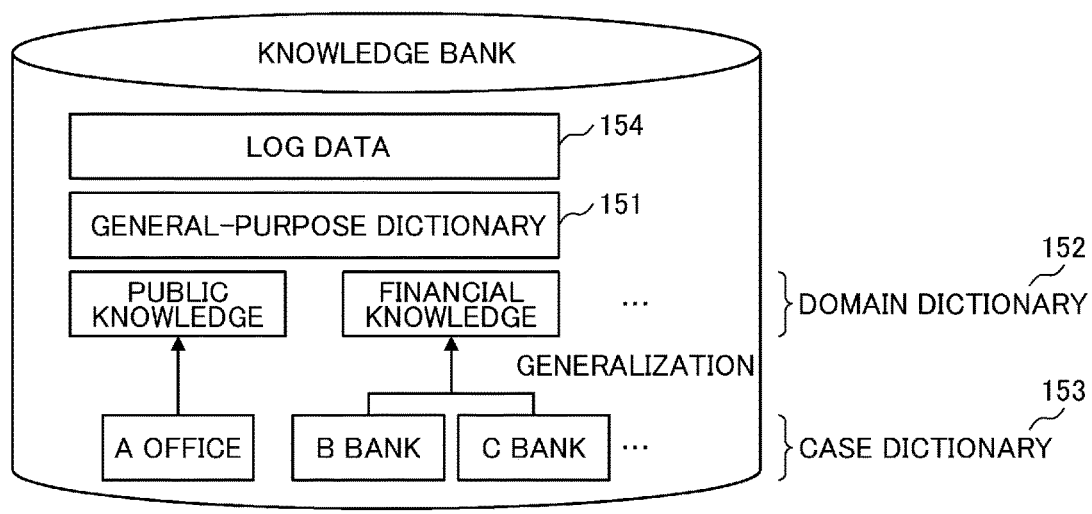
FIG. 2 is a conceptual diagram illustrating a hierarchical structure of knowledge stored in the knowledge bank 1.

Hereinafter, embodiments will be described in detail with reference to the drawings. However, the invention is not construed as being limited to the description of the following embodiments. It is easily understood by those skilled in the art that the specific configuration of the invention can be changed without departing from the spirit or spirit of the invention.

In the structure of the invention described below, the same portions or portions having similar functions are denoted by the same reference numerals in different drawings and the description thereof may be omitted in some cases.

In a case in which there are a plurality of elements having the same or similar functions, the same reference numerals may be given different subscripts for description. However, in a case in which there is no need to distinguish a plurality of elements, the description of the elements may be made with suffixes omitted.

For example, notations, such as "first", "second", and "third", in the specification are used to identify components and do not necessarily limit the number, order, or content thereof. In addition, numbers for identifying components are used for each context and numbers used in one context do not necessarily indicate the same configuration in another context. Further, a component identified by one number may also have the function of a component identified by another number.

For example, in some cases, the position, size, shape, and range of each component illustrated in the drawings are different from the actual position, size, shape, and range for ease of understanding of the invention. Therefore, the invention is not necessarily limited to, for example, the position, size, shape, and range disclosed in the drawings.

An example of a system described in the following embodiments has the function of a knowledge DB including a hierarchical synonym dictionary. Synonym dictionaries hierarchized into a plurality of arbitrary layers include, for example, general-purpose dictionaries that do not depend on the business field, field-specific dictionaries applied to specific fields, such as finance, transportation, and public, and case dictionaries applied to individual tasks within a specific field. The system described in the embodiments has another function of generalizing or expanding a dictionary. In addition, the system has a function of applying the content of a dictionary to specific sentences, for example, a set of a question and an answer (referred to as "Q & A"), considering the distribution of the context and the content of the sentences, in a case in which the content of the dictionary is applied. The system having one or more of these functions is referred to as a knowledge bank in the embodiments.

In the embodiments, "generalization" and "generalizing" mean that an upper-layer dictionary is generated from hierarchical lower-layer dictionaries. "Knowledge" indicates "(content of) a synonym dictionary". "Application" means "applying" a synonym extracted from the knowledge bank to a certain context. For example, "application" means that a synonym registered in the dictionary is "applied" to the actual Q & A. "Expansion of knowledge" or "expansion of a dictionary" means "increasing synonym pairs". A process for increasing synonym pairs is referred to as "inference".

<1. Overall Configuration of Knowledge Bank>

FIG. 1 is a block diagram illustrating the hardware configuration of a knowledge bank 1 according to an embodiment. The knowledge bank 1 according to the embodiment is an information processing apparatus such as a database server. Similarly to a general information processing apparatus, the knowledge bank 1 includes, for example, a central processing unit (CPU) 11, a data communication unit 12, an input/output device 13, a control unit 14, a storage device 15, an input processing unit 16, and an output processing unit 17.

In this embodiment, for example, calculation and control functions are implemented by the execution of a program (not illustrated) stored in the storage device 15 by the CPU 11 and a predetermined process is implemented in cooperation with other hardware components. In some cases, the program executed by the CPU 11, the function of the program, or a means for implementing the function is referred to as, for example, a "function", a "means", a "portion", a "unit", or a "module". In this embodiment, these are indicated by functional blocks as the control unit 14. In this embodiment, functions equivalent to the functions implemented by software can also be implemented by hardware such as a field programmable gate array (FPGA) or an application specific integrated circuit (ASIC).

The data communication unit 12 can communicate with an external terminal or a DB through a network 20. An input/output device that can transmit and receive data to and from an image display device and a keyboard which are generally provided in an information processing apparatus, such as a server, and the outside of the knowledge bank 1 is assumed as the input/output device 13. The input processing unit 16 and the output processing unit 17 process information that is input and output. The control unit 14 includes a generalization unit 141, a generation unit 142, and an inference unit 143 as functions. The generalization unit 141 has a function of performing generalization. The generation unit 142 has a function related to the application of synonyms. The inference unit 143 has a function of expanding a dictionary. Further, the storage device 15 is configured by any combination of a non-volatile memory, such as a magnetic disk device, and a volatile memory, such as a semiconductor memory. Examples of the DB stored in the storage device 15 include a general-purpose dictionary 151, a domain dictionary 152, a case dictionary 153, and log data 154, which will be described in detail below.

In the configuration illustrated in FIG. 1, the knowledge bank 1 is described as a database server including a DB. However, the DB may be separated as an external DB and may be configured as a terminal that calls only data through the network 20 and processes the data. Conversely, only an arbitrary function of the control unit 14 may be independently configured as an information processing apparatus. The components illustrated in FIG. 1 do not need to be integrated into one device as long as each of the components can transmit and receive data through a wired or wireless network.

<2. Overall Configuration of DB>

FIG. 2 is a conceptual diagram illustrating a hierarchical structure of knowledge stored in the knowledge bank 1. Specifically, FIG. 2 illustrates a synonym dictionary stored in the storage device 15. In this example, there are three layers. However, the number of layers may be greater or less than 3. In this embodiment, the general-purpose dictionary 151 is a dictionary that does not depend on the business field, the domain dictionary 152 is a field-specific dictionary that is applied to the same field, such as finance or public, and the case dictionary 153 is a dictionary that is applied to each task in the same field, for example, to each business entity. Since the general-purpose dictionary 151 does not depend on the field, the general-purpose dictionary 151 is suitable to be applied to a new case in a new field. The domain dictionary 152 is suitable to be applied to a new case in the same field.

It is assumed that the case dictionary 153 stores a sentence example used in the case, for example, Q & A text data in addition to a synonym dictionary. It is assumed that text data of a lower-layer dictionary (for example, the case dictionary 153) can also be used in an upper-layer dictionary (for example, the domain dictionary 152). A method for storing text data is, for example, as illustrated in FIG. 4 which will be described below. In a typical example, a synonym dictionary or text data in the case dictionary 153 which is a lower-layer dictionary is generated and input by the user. The general-purpose dictionary 151 or the domain dictionary 152 which is an upper-layer dictionary can be generated by a generalization method as described in the following embodiments.

For example, in a case in which the knowledge bank proposes a synonym to be applied to a given sentence and the user determines whether or not the content is appropriate, the log data 154 stored in the knowledge bank 1 according to this embodiment stores the result of the user's determination. The log data 154 will be described in detail below.

<3. Usage Example of Knowledge Bank>

Figure 3:
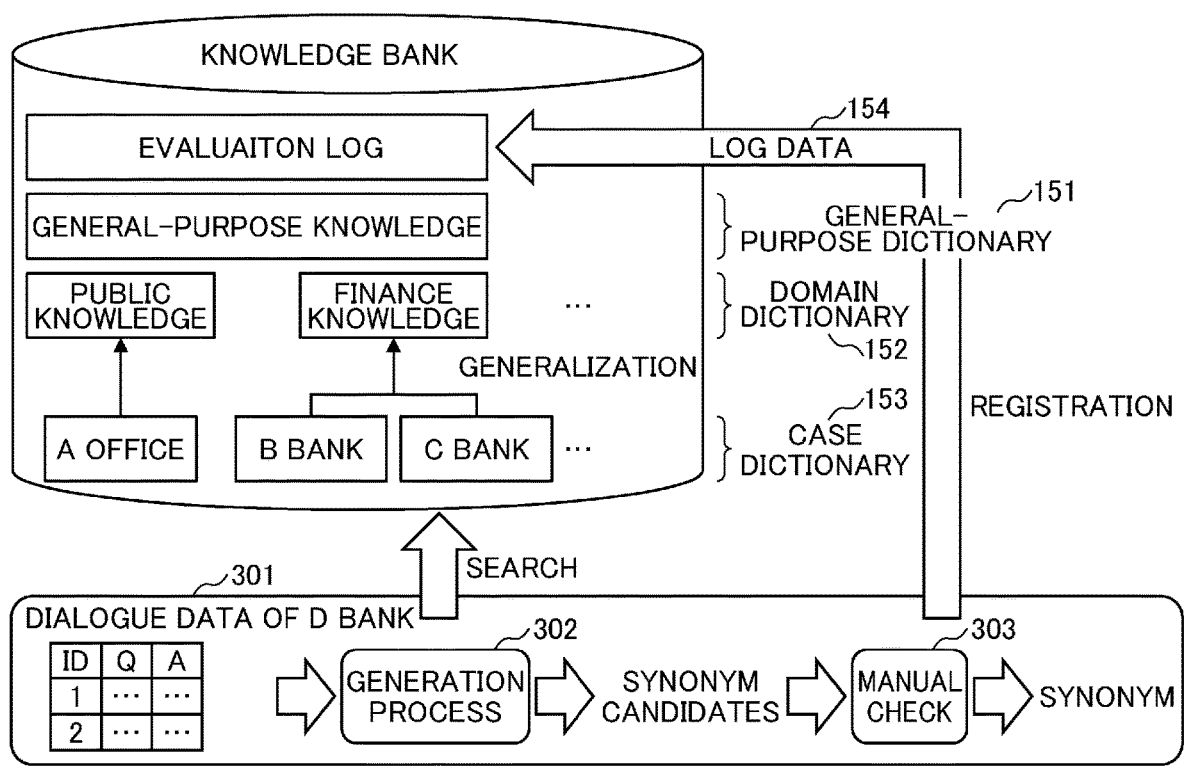
FIG. 3 is a conceptual diagram illustrating an example of the usage of the knowledge bank 1.

FIG. 3 is a conceptual diagram illustrating an example of the usage of the knowledge bank 1. Here, an example is considered in which there is a knowledge bank including the case dictionaries 153 of an A office, a B bank, and a C bank, the domain dictionaries 152 of public and finance, and the general-purpose dictionary 151 and the knowledge bank is used to extract the synonyms of words in dialogue data 301 of a D bank.

The dialogue data 301 of the D bank is, for example, a Q & A text prepared by the user and is input as text data from the input/output device 13. The generation unit 142 searches the knowledge bank to generate synonym candidates of any word in the dialogue data (S302).

FIG. 4 illustrates an example of the dialogue data 301. A pair of a question text and an answer text is prepared for each dialogue ID of the D Bank. In the dialogue data 301, words to be developed with synonyms are surrounded by symbols < >. The user may select the word to be developed, or a noun or verb may be automatically extracted by known syntax analysis.

FIG. 5 illustrates an example of the domain dictionary 152 in which a list of synonyms of the financial domain is stored. In this example, the domain dictionary 152 of finance is searched in order to search for synonyms in the dialogue data 301 of the D bank which is a new case. However, a plurality of arbitrary synonyms may be selected and searched from other case dictionaries 153 or other general-purpose dictionaries 151. For "elevator" in the dialogue data 301, the generation unit 142 extracts, for example, "elevating device" and "lift" from the case dictionary 153 and displays the extracted words as synonym candidates on the input/output device 13.

Here, a "headword" means an ID indicating a set of synonyms. For example, the ID of a synonym set {elevator, elevating device, lift} is referred to as <elevator> for ease of understanding. A set of synonyms corresponds to one headword.

FIG. 6 illustrates an example of the case dictionary 153 and illustrates the content of the case dictionary 153 of the A office which is a lower-layer dictionary of the public domain. In this embodiment, the case dictionary 153 is knowledge in the lowest layer of the knowledge bank. For example, a synonym relationship in the case dictionary 153 is basically created and registered by the user or is input from the input/output device 13.

The general-purpose dictionary 151 and the dictionaries in other layers basically have the same configuration as the domain dictionary 152 and the case dictionary 153. However, in some cases, synonym sets formed by synonyms are different from each other.

The user checks the synonym candidates extracted as the result of searching the synonym dictionary on a display device of the input/output device 13 and evaluates whether or not the synonym candidates are valid. Then, for example, the user inputs the classification of true and false (S303). As described above, the display device or the input device used by the user to perform the evaluation may be another device that is in a remote place and is connected to the network 20. In this case, the knowledge bank 1 transmits the information to be displayed from an input/output interface of the input/output device 13 and receives the transmitted input of the user.

FIG. 7 illustrates an example of an input screen that is displayed on the display device of the input/output device 13 for evaluation. It is evaluated whether or not a synonym included in a synonym set registered in a certain dictionary is appropriate to be included in the synonym set in consideration of the sentence to be applied (here, the dialogue data 301 of the D bank). In this embodiment, the results of the user's evaluation of whether or not a synonym can be appropriately applied are counted in each synonym dictionary and are recorded as the log data 154, which will be described below.

In FIG. 7, a synonym set {elevator, elevating device, facility} related to the headword "elevator" in the dictionary of the financial domain is displayed on the left side of the screen. The type of dictionary is displayed in a dictionary type display region 701. In a case in which a plurality of synonym dictionaries are searched, the dictionaries are switched by, for example, a pull-down menu. A headword 702 can be switched by switches 703 and 704. Synonyms corresponding to the headword 702 are displayed in a synonym list 705. The user's evaluation "True/False" is input to an evaluation field 706 in the left window.

In FIG. 7, a text including the headword from the dialogue data 301 of the D bank is displayed on the right side of the screen. Here, a pair of a question text 707 and an answer text 708 including "elevator" is displayed. Information indicating that the texts are related to the dialogue data of the D bank is displayed in a domain display field 709. A score SS calculated by a method which will be described below is displayed in a score field 710 and an evaluation field 711. The score field 710 and the evaluation field 711 may be omitted. The evaluation field 711 is not used in this example. Two Q & As are illustrated in FIG. 7. However, the number of Q & As may be one or three or more.

Here, the user determines whether or not it is appropriate to include each element of the synonym set {elevator, elevating device, facility} in the synonym set while referring to the dialogue data of the D bank. In the example illustrated in FIG. 7, the user determines that "elevator" and "elevating device" are appropriate and inappropriate conversion is performed when "facility" is included in the synonym set.

The evaluation result is stored in the knowledge bank as the log data 154 along with the ID of the dictionary from which the synonym candidates have been extracted and the text of the applied sentence. The evaluation by the user can also be performed when the knowledge bank proposes a new synonym set. In addition, the evaluation can also be performed when the knowledge bank proposes the synonym candidates to be registered in the dictionary.

Further, a default value may be displayed in the evaluation field 706 on the basis of the count of the log data. For example, for a word that has been evaluated to be "False" a predetermined number of times or more, "False" is displayed in the evaluation field 706. The user can change the default value. In a case in which the user changes the default value in the evaluation field 706 or in a case in which the user does not change the default value, the default value can also be included in the log data count. In a case in which the user has not changed the default value, it is determined that the user has confirmed the default evaluation and the default evaluation can be incremented by 1. In a case in which the user has changed the default value, it is determined that the opposite of the default evaluation has been evaluated and evaluation opposite to the default can be incremented by 1. Alternatively, the change in the default value may not be included in the count.

As described above, for the dialogue data 301 of the D bank, synonym development can be performed using the synonyms that have been evaluated to be "True" by the user. Further, a new case dictionary 153 for the D bank may be generated using the result and then registered in the knowledge bank 1.

FIG. 8A is a table illustrating an example of a data format recorded on the log data 154. For example, information 801 that specifies a dictionary in which the evaluated synonym set is stored, a time stamp 802, an evaluated user ID 803, a headword 804, a synonym 805, a question text 806, an answer text 807, and evaluation 808 for true and false are recorded. In addition, classification 809 indicates in which phase the evaluation has been performed. The evaluation phases are divided into generalization, expansion, and application. For example, the time stamp 802, the user ID 803, and the classification 809 may be optional. Further, the question text 806 and the answer text 807 may be optional items in the application phase. Conversely, other items, for example, the domain names of the question text 806 and the answer text 807 may be added.

The first to sixth rows in FIG. 8A are examples in which the example of the input illustrated in FIG. 7 is log data. Evaluations for the synonyms "elevator", "elevating device" and "facility" of the headword "elevator" applied to the dialogue data 301 of the D bank are input. For example, with reference to the displayed question text and answer text, the user determines whether or not it is appropriate to include the synonyms in the synonym set of the headword "elevator" in this sentence example. Therefore, as the configuration of log data, the evaluation 808 of True or False is given to a set of the headword 804 and the synonym 805.

As described above, in this embodiment, the evaluation of a synonym by the user indicates whether or not it is appropriate for the synonym to be included in a certain synonym set in a certain situation. In the log data, True/False is recorded for a pair of the headword and the synonym.

In the example illustrated in FIG. 8A, for the synonyms "elevator" and "elevating device", two Q & As on the right side of FIG. 7 are evaluated to be "True". For the synonym "facility", two Q & As on the right side of FIG. 7 are evaluated to be "False". An input method does not need to be limited to the method illustrated in FIG. 7 as long as a combination of a synonym and a text to which the synonym is applied can be evaluated.

<4. Generalization of Knowledge in Knowledge Bank>

As described above, in the hierarchical knowledge bank, a plurality of dictionaries, particularly, upper-layer dictionaries are searched. Therefore, search can be performed without being limited to a specific case dictionary and it is possible to search for a synonym set suitable for a document. Next, how to generalize knowledge in the knowledge bank, that is, how to register synonyms in the upper-layer dictionary will be described.

Figure 9:
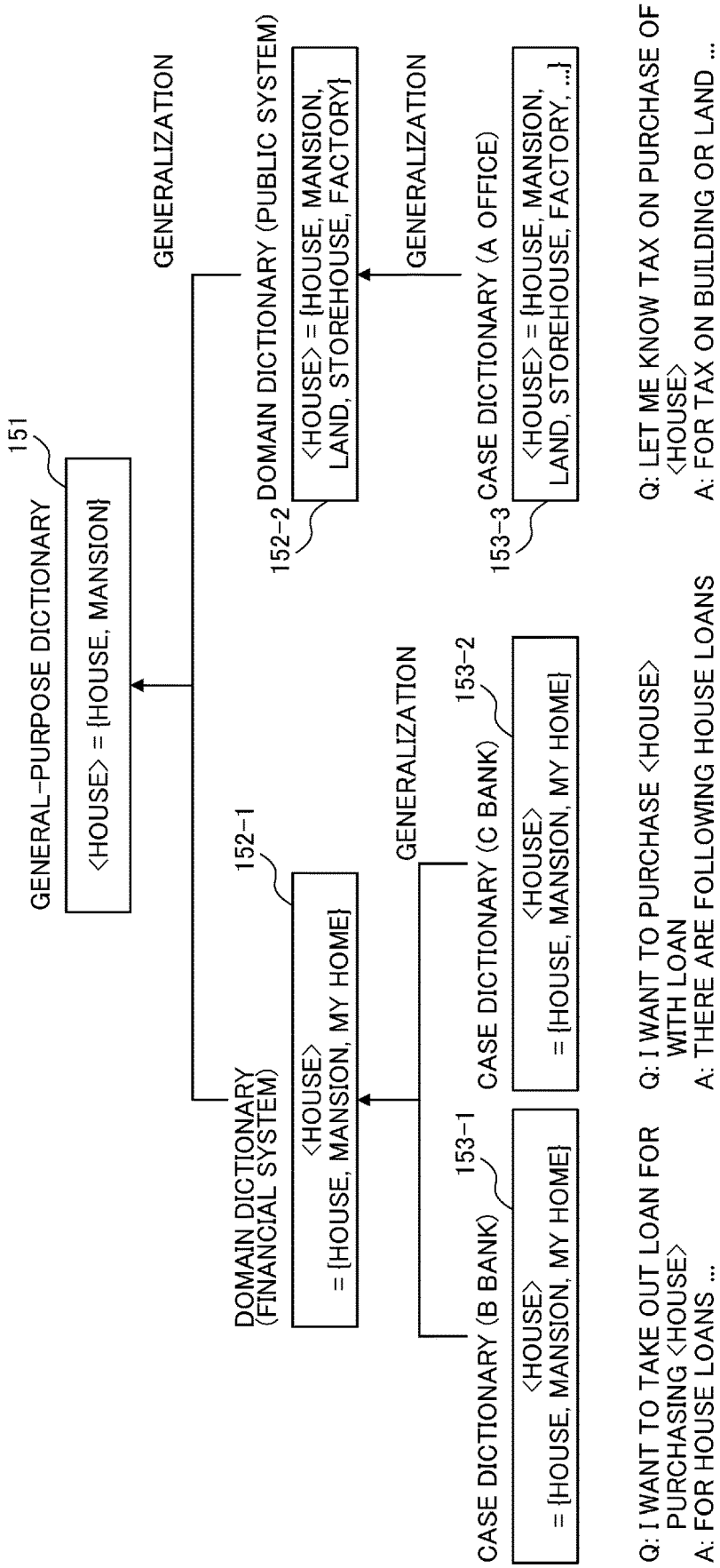
FIG. 9 is a conceptual diagram illustrating a generalization processing using the extraction of a common part.

FIG. 9 is a conceptual diagram illustrating a process of extracting a common part for generalization. The registration of a synonym in a certain upper-layer dictionary X (for example, a financial domain dictionary 152-1) is considered. It is assumed that a set of dictionaries y (for example, a case dictionary 153-1 of the B bank and a case dictionary 153-2 of the C bank) in the lower layer of an upper-layer dictionary X is Y. The set Y includes lower-layer dictionaries y1, y2, . . . . The generalization unit 141 registers the words that have been commonly registered as synonyms in the lower-layer dictionaries y1, y2, . . . in the upper-layer dictionary X as synonyms.

For example, "house", "mansion", and "my home" are registered as synonyms in both the case dictionary 153-1 of the B bank and the case dictionary 153-2 of the C bank. Therefore, these words are also registered as synonyms in the upper-layer financial domain dictionary 152-1. The words "house" and "mansion" are registered as synonyms in both the financial domain dictionary 152-1 and the public case dictionary 152-2. Therefore, the words are also registered as synonyms in the upper-layer general-purpose dictionary 151.

In the above-mentioned method, a common part of the lower-layer dictionaries is used in the upper-layer dictionary. Therefore, a synonym relationship is likely to be established in the same case and the same field. However, in the method of extracting the common part, since only narrowing-down is performed, words that are originally synonyms are removed. Therefore, in this embodiment, a method is proposed which creates a synonym set in a wide range while allowing some exceptions and allows the user to evaluate whether to apply the synonym set. In this case, when the range is too wide, noise increases and the time and effort required for the user to perform evaluation increases. Therefore, in the following embodiments, measures, such as a coverage rate and an error rate, are introduced.

Figure 10:
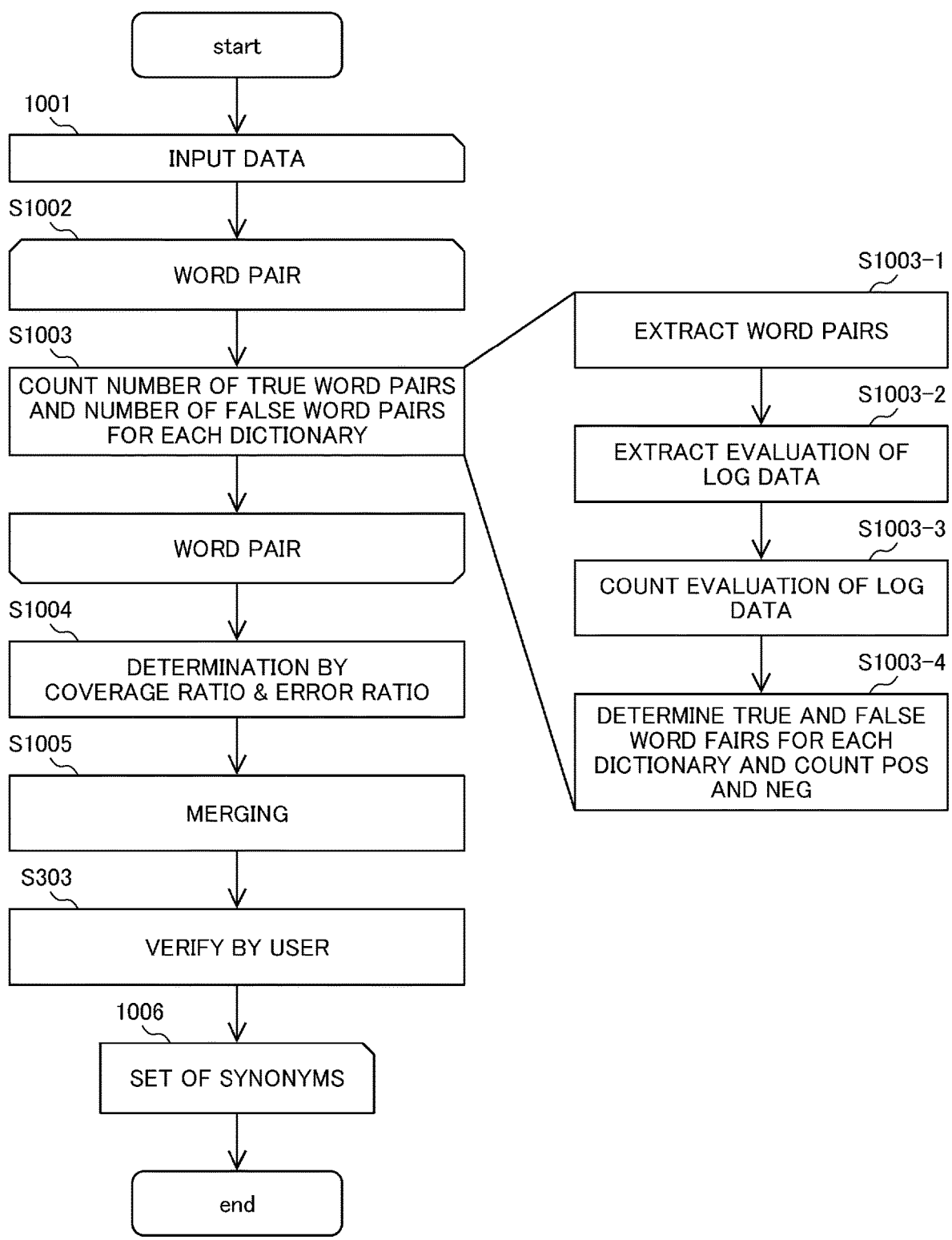
FIG. 10 is a flowchart illustrating a sequence of extracting a synonym candidate.

FIG. 10 is a flowchart illustrating a sequence of extracting synonym candidates in consideration of the coverage rate and the error rate in the generalization unit 141. It is considered that synonyms are registered in the upper-layer dictionary X (for example, the domain dictionary 152). In this case, a set of synonyms to be registered in the upper-layer dictionary X is calculated from the results of synonym evaluation by the user in the set Y of the lower-layer dictionaries (for example, the case dictionaries 153) below the upper-layer dictionary X. This process can be performed at an arbitrary timing as needed or periodically.

The following are used as input data 1001:

1) Synonym data of the lower-layer dictionary y below the upper-layer dictionary X;

2) User evaluation data for synonym candidates in each lower-layer dictionary y below the upper-layer dictionary X;

3) The number N of lower-layer dictionaries y below the upper-layer dictionary X;

4) A lower limit value BC of an arbitrarily set coverage rate; and

5) An upper limit value BE of an arbitrarily set error rate.

1) The synonym data of the lower-layer dictionary y can be obtained from each dictionary (for example, the case dictionary 153 illustrated in FIG. 6). 2) The user evaluation data can be obtained from the log data 154. As described in FIG. 7 and FIGS. 8A to 8D, the synonym candidates proposed on the basis of the synonyms registered in the dictionary are classified and evaluated to be True and False by the user in each phase of generalization, expansion, and application. The evaluation by the user used in 2) is determining whether or not each synonym in the same synonym set is included in the synonym set. That is, it is evaluated whether a set of the headword and the synonym is True or False. As described in FIGS. 8A to 8D, this evaluation result is recorded on the log data 154.

In a process S1003, the number of synonym pairs evaluated to be true and the number of synonym pairs evaluated to be false are counted for each dictionary. The process S1003 will be described in detail in processes S1003-1 to S1003-4 on the right side of FIG. 10.

The generalization unit 141 extracts word pairs (w1, w2) from the synonym data of the lower-layer dictionary y (S1003-1). Then, assuming that a headword common to the word pairs (w1, w2) is x, evaluation data for the evaluation result of x and w1 and the evaluation result of x and w2 is extracted with reference to the log data 154 (S1003-2). Then, the number of true cases pos and the number of false cases neg are counted for each dictionary (S1003-3).

Specifically, assuming that the synonym candidates of the general-purpose dictionary 151 illustrated in FIG. 9 are extracted, the generalization unit 141 extracts a word pair "elevator" and "facility" from the synonym set of the headword <elevator> in the financial domain dictionary 152-1 which is a lower-layer dictionary (S1003-1). Then, the generalization unit 141 refers to the log data 154 for the evaluation result of the headword <elevator> and "elevator" and the evaluation result of the headword <elevator> and "facility" (S1003-2). In the example illustrated in FIG. 8A, the number of times <elevator> and "elevator" are evaluated to be True is 2 and the number pos is plus 2. In addition, the number of times <elevator> and "facility" are evaluated to be False is 2 and the number neg is plus 2. This counting process is performed for each dictionary (S1003-3).

In a case in which it is determined whether or not a synonym pair is correct in the generalization process, a certain synonym pair is determined to be correct (true) when the synonym pair has the same headword and both synonyms are evaluated to be true. In practice, since the log data includes evaluations of a plurality of evaluators at a plurality of timings, it is assumed that different evaluations are given to the same pair of a headword and a synonym. Therefore, the evaluation result for each dictionary is determined by a majority vote from the total result, which will be described below (S1003-4).

FIG. 11 is a table illustrating the concept of counting. The evaluation results of a pair of a headword 1101 and a synonym 1102 in a dictionary designated by a domain 1107 and a case 1106 are counted. In this example, B-bank and C-bank dictionaries of the financial domain are targets. Counting can be performed on the basis of the log data as illustrated in FIGS. 8A to 8D. In a case in which the log data has different phases of application, generalization, and expansion as illustrated in FIGS. 8A to 8D, for example, only the data of the application phase may be used. Alternatively, all data may be used and different weights may be assigned to the phases.

In the process S1003-1, the system automatically generates a word pair (synonym pair) corresponding to the headword. In FIG. 11, a synonym set {house, factory, home} corresponding to a headword <house> is extracted and a synonym pair is generated from these synonyms. As illustrated in FIG. 11, in the corresponding dictionary, the log data is referred to in the process S1003-2 and the number of times 1104 each synonym is evaluated to be true and the number of times 1105 each synonym is evaluated to be false are counted in the process S1003-3. As the comprehensive evaluation result 1103, it is determined whether the corresponding synonym (candidate) is likely to be evaluated as an appropriate synonym or an inappropriate synonym in each dictionary on the basis of the number of true cases and the number of false cases. The comprehensive evaluation result may be simply evaluated by the number of cases or any weights may be assigned to true and false. In addition, other methods may be used.

Statistically, it can be said that synonyms which are counted as true many times are appropriately rephrased many times (that is, have high versatility) and synonyms which are counted as false many times are inappropriately rephrased many times (that is, have low versatility). Therefore, it is possible to determine whether or not to set the synonym registered in the lower-layer dictionary as a candidate to be registered in the upper-layer dictionary, on the basis of the count of false cases and the count of true cases.

As described above, a certain synonym pair is determined to be correct (true) only in a case in which the synonym pair has the same headword and both synonyms are evaluated to be true. Therefore, in the example illustrated in FIG. 11, in the dictionary of the B bank, a synonym pair of "house" and "home" is true and a synonym pair of "house" and "factory" and a synonym pair of "home" and "factory" are false. In the dictionary of the C bank, all of the synonym pair of "house" and "home", the synonym pair of "house" and "factory", and the synonym pair of "home" and "factory" are determined to be true.

The synonym pairs are determined to be true or false in each dictionary in this way and the generalization unit 141 obtains the following information from the log data 154:

True: {y1:{(p1, p2), ... }, y2:{ ... }, ... } (where p1 and p2 are words); and

False: {y1:{(n1, n2), ... }, y2:{ ... }, ... } (where n1 and n2 are words).

Here, y1 and y2 indicate lower-layer dictionaries, (p1, p2) is a word pair recorded as true, and (n1, n2) is a word pair recorded as false.

For each word pair (x1, x2), the number of dictionaries in which the word pair (x1, x2) frequently appears as true is counted and defined as POS. Similarly, the number of dictionaries in which the word pair (x1, x2) frequently appears as false is defined as NEG (S1003-4). In the example illustrated in FIG. 11, assuming that targets are two dictionaries, that is, the dictionary of the B bank and the dictionary of the C bank, POS and NEG for the synonym pair of "house" and "home" are 2 and 0, respectively, POS and NEG for the synonym pair of "house" and "factory" are 1 and 1, respectively, and POS and NEG for the synonym pair of "home" and "factory" are 1 and 1, respectively.

Next, in a case in which the following conditions are satisfied, the word pair (x1, x2) is set as a synonym pair candidate in the upper-layer dictionary X (S1004):

POS/N≥lower limit value of coverage rate; and

NEG/N≤upper limit value of error rate (N is the number of lower-layer dictionaries y belonging to the set Y).

The lower limit value of the coverage ratio and the upper limit value of the error rate are set in advance by the user. Assuming that POS/N and NEG/N have values in the range of 0 to 1, both the coverage rate and the error rate have values in the range of 0 to 1. A coverage rate of 1 means that there are many cases in which synonyms have been evaluated to be appropriate in all dictionaries. An error rate of 1 means that there are many cases in which synonyms have been evaluated to be inappropriate in all dictionaries.

In a case in which the word pairs (x1, x2) set as the synonym candidates are, for example, a synonym pair of "number" and "telephone number" and a synonym pair of "number" and "phone number", a merging process is performed to form a synonym set of "number", "telephone number", and "phone number" (S1005). After the synonym set is obtained, a person evaluates whether or not the synonym set is appropriate (S303). The evaluation result is registered as the log data 154.

FIG. 12 illustrates an example of an input screen that is displayed on the display device of the input/output device 13 in order for the user to evaluate whether or not a synonym set is appropriate. It is evaluated whether or not the synonyms registered in the lower-layer dictionary set Y are appropriate to be registered as a synonym set in the upper-layer dictionary X. The basic configuration is the same as that illustrated in FIG. 7. Information indicating whether or not the synonym set which have been extracted in the process S1005 and are used as the synonym candidates in the upper-layer dictionary X are established as synonyms is input to the evaluation field 706.

In the example illustrated in FIG. 12, a synonym set of "application", "notification", and "submission" belonging to the headword "application" is displayed on the left side of the screen and text extracted from the related domain is displayed on the right side of the screen. In this example, since a synonym set of the financial domain dictionary is generated, Q & A texts obtained from the case knowledge of the bank may be displayed for reference.

The user inputs information indicating whether or not the synonym candidates are appropriate for these Q & As to the evaluation field 706.

The first to third rows in FIG. 8B show examples in which the example of the input in FIG. 12 is log data. Evaluations for synonym candidates "application", "notification", and "submission" of a headword "application" applied to the dialogue data 301 of the A bank and the B bank belonging to the financial domain are input. In this example, the synonyms "application" and "notification" are evaluated to be "True" and the synonym "submission" is evaluated to be "False". An input method does not need to be limited to the method illustrated in FIG. 12 as long as synonyms can be evaluated. A synonym set 1006 including "application" and "notification" is obtained as a result of the user's evaluation and is then registered in the upper-layer dictionary X.

<5. Expansion of Knowledge in Knowledge Bank>

A process of expanding knowledge in the knowledge bank, that is, a process of increasing synonym pairs will be described. Deductive inference can be used in the estimation of the synonym relationship. For example, when "number" and "telephone number" are synonyms and "number" and "phone number" are synonyms, deductive inference that "telephone number" and "phone number" are synonyms is established. However, whether or not words are synonyms is also related to the context used. For example, assuming that "number" and "personal number" are synonyms and "number" and "telephone number" are synonyms, it is difficult to say that "telephone number" and "personal number" are synonyms in all contexts (in the above-mentioned generalization of knowledge, the merging process is performed between the words with a high possibility of synonyms).

Whether synonyms can be construed as having the same meaning depends on the context. Therefore, when the number of synonyms for a word in a particular context increases, it is necessary to consider whether or not the synonyms are matched with the context. Therefore, in the following embodiment, the expansion of a dictionary in consideration of the similarity between contexts will be described.

In this embodiment, the following three elements are considered: (1) the context of a sentence in which a synonym is established; (2) the context of a sentence to which a synonym is applied; and (3) a set of sentences to which a synonym is applied. As an example of (3), in a case in which the synonym to be applied is used for a Q & A with a different answer in a Q & A list to which the synonym is applied, it is supposed that the synonym is used with a different meaning and the synonym is not applied.

In the following embodiment, for (1), the "similarity" of the context is used to evaluate application. In a case in which Q & A is used for the context, the similarity is evaluated in consideration of a combination of the similarities between Q and A. For example, in a case in which a and b are defined as synonyms in a Q & A pair of a question text Q1 and an answer text A1 and b and c are defined as synonyms in a Q & A pair of a question text Q2 and an answer text A2, whether or not a and c can be defined as synonyms is determined on the basis of similarities using Q1, Q2, A1, and A2. For example, combinations of the similarities and the evaluation of the similarities are as follows:

The similarity between Q1 and Q2 is high and the similarity between A1 and A2 is high: high similarity;

The similarity between Q1 and Q2 is low and the similarity between A1 and A2 is high: medium similarity (high);

The similarity between Q1 and Q2 is high and the similarity between A1 and A2 is low: medium similarity (low); and The similarity between Q1 and Q2 is low and the similarity between A1 and A2 is low: low similarity.

In this embodiment, in an information processing method that outputs new knowledge based on the registered knowledge, a new knowledge inference unit 143 is used. The inference unit uses different contribution rates for different types of sentences, such as questions and answers in a dialogue. According to this embodiment, since different contribution rates are used for different types of data, it is possible to expand knowledge with high accuracy.

Figures 13, 14:
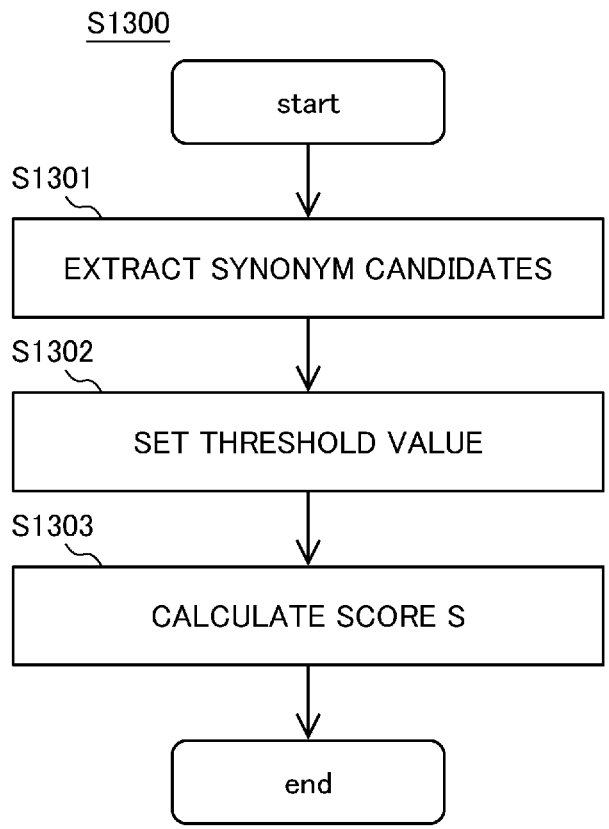
FIG. 13 is a flowchart illustrating the overall flow of a knowledge expansion process S1300.
FIG. 14 is a table showing an example of a public knowledge domain dictionary 152.

FIG. 13 is a flowchart illustrating the overall flow of a knowledge expansion process S1300 performed by the inference unit 143 of the knowledge bank 1. This process can be performed at any timing. Alternatively, this process may be performed periodically.

First, synonym candidates are extracted (S1301). In the extraction of the synonym candidates, the inference unit 143 reads at least a part of the general-purpose dictionary 151, the domain dictionary 152, and the case dictionary 153 from the storage device 15. The range in which data is used may be arbitrarily determined. For example, the range may be determined by the domain of the same business. In a case in which a and b are defined as synonyms and a and c are defined as synonyms in any knowledge, b and c form a word pair of the synonym candidates.

FIG. 14 illustrates an example of the domain dictionary 152 of public knowledge. In a case in which the synonyms illustrated in FIG. 14 are defined in the public domain, "home" and "house" are defined as synonyms in the first row, and "home" and "housing" are defined as synonyms in the third row, "house" and "housing" form a word pair of the synonym candidates.

FIG. 15 illustrates another example of the domain dictionary 152 of public knowledge. As illustrated in FIG. 14, in a case in which there are a plurality of synonyms "house" and "living place" for "home" in the first row, two synonym candidate word pairs, that is, a synonym candidate word pair of "house" and "housing" and a synonym candidate word pair of "living place" and "housing" are formed.

In the above-mentioned example, synonym candidates are extracted from the same dictionary. However, synonym candidates may be extracted from a plurality of dictionaries. For example, in a case in which "account" and "bank account" are synonyms in the case dictionary 153-1 of the B bank and "account" and "deposit account" are synonyms in the case dictionary 153-2 of the C bank, "bank account" and "deposit account" may be used as the synonym candidates. The user may arbitrarily set the conditions of a target dictionary.

Then, the user sets a numerical value as a threshold value for determining whether to register the synonym candidate as a synonym or other parameters (S1302). The function of the threshold value will be described below. Then, the inference unit 143 calculates the score of the word pair of the synonym candidates (S1303).

Here, the score is used to evaluate whether or not the synonym candidate is appropriate as a synonym in consideration of the context of the sentence to which the synonym is assumed to be applied. As a basic idea, when a sentence in which a synonym relationship between a and b is established is similar to a sentence in which a synonym relationship between a and c is established, it is assumed that a synonym relationship between b and c is established. Various methods that vectorize and compare sentences have been known in order to measure the similarity between sentences. Since the vectorization of sentences is well known, the detailed description thereof will not be repeated.

In an evaluation method using the similarity between sentences, in a case in which synonym candidates b and c are applied to a certain Q & A, the score S of the synonym candidates is illustrated as follows:

$$S = \tfrac{1}{2} * \mathrm{sim}(q1, q2) + \tfrac{1}{2} * \mathrm{sim}(a1, a2).$$

Here, q1 and a1 are a question text and an answer text in which the synonymous relation of b with a headword a is established, respectively, q2 and a2 are a question text and an answer text in which the synonym relationship of c with the headword a is established, respectively, and sim is a function indicating the similarity.

In the calculation of the score S, the question text and the answer text are treated as the same weight. However, according to the studies of the inventors, it is more desirable to consider the following two elements for the score.

(1) Particularly, in dialogue data, the similarity of an answer text is more correlated with the determination of whether or not a synonym candidate is a synonym than the similarity of a question text. Therefore, in the evaluation of the similarity, it is preferable that the similarity of the answer text is weighted and evaluated rather than the similarity of the question text.

(2) In dialogue data, in a case in which an expression similar to a sentence obtained by substituting the synonym candidate is present as a question text having a different answer text in the same dialogue data, the expression is considered as a penalty term. That is, different answer texts mean that question texts have different meanings. A case in which the question texts are similar even though the synonym candidates are substituted means that the substitution is inappropriate.

It is assumed that there is a question text-answer text pair of a question text $q1i$ and an answer text $a1i$ in dialogue data 1, $q1i$ includes a headword <e1>, and syn11 and syn12 are defined as synonyms of <e1>. In addition, it is assumed that a question text set $\{q11, \ldots, q1i, \ldots, q1n\}$ included in the dialogue data 1 is defined as Q1. In contrast, it is assumed that there is a question text-answer text pair of a question text $q2j$ and an answer text $a2j$ in dialogue data 2, $q2j$ includes a headword <e2>, and syn11 and syn22 are defined as synonyms of <e2>. In addition, it is assumed that a question text set $\{q21, \ldots, q2j, \ldots, q2m\}$ included in the dialogue data 2 is defined as Q2. Here, it is assumed that i, j, n, and m are positive integers and satisfy the following relationship: $1 \leq i \leq n$ and $1 \leq j \leq m$.

FIG. 16 is a table illustrating an example of the dialogue data 1, the dialogue data 2, synonym data of the dialogue data 1, and synonym data of the dialogue data 2. These data items are obtained from the dictionary from which synonym candidates have been extracted, for example, the case dictionary 153 and need to include dialogue data. For example, the dialogue data 1 and the synonym data of the dialogue data 1 are acquired from the case dictionary 153-1 of the B bank. The dialogue data 2 and the synonym data of the dialogue data 2 are acquired from the case dictionary 153-2 of the C bank.

In the example illustrated in FIG. 16, since syn11 and syn12 are synonyms in the dialogue data 1 and syn11 and syn22 are synonyms in the dialogue data 2, syn12 and syn22 are extracted as the synonym candidates in the process S1301. Here, the following expression is used to calculate the score S for determining whether or not the synonym candidates syn12 and syn22 can be defined as synonyms.

$$S = (1 - K)*sim(q1, q2) + K*sim(a1, a2) -$$
$$L*\max\{sim(q1, f1(q, syn11, syn22)); q \in Q1 - \{f2(q1i)\}\} -$$
$$L*\max\{sim(q2, f1(q, syn11, syn12)); q \in Q2 - \{f2(q2j)\}\}$$

In the first and second terms on the right side, q1 and a1 are a question text and an answer text of the dialogue data 1, respectively, and a synonym relationship between a and b is established. In addition, q2 and a2 are a question text and an answer text of the dialogue data 2, respectively, and a synonym relationship between a and c is established. Further, sim is a function indicating similarity. In a case in which a synonym appears in a plurality of Q & As, the first term on the right side is averaged. For example, a case in which the dialogue data 1 includes q1i and q1k and the headword <e1> is included in both q1i and q1k. Here, k is a positive integer and satisfies the following relationship: 1≤k<i or i<k≤n. At that time, the first term on the right side is as follows:

(1−K)*avg(sim(q1i,q2j)+sim(q1k,q2j)).

This holds for the second term.
The third term is as follows:

L*max{sim(p,f1(q,syn11,syn22));q∈Q1−{f2(q1i),f2(q1k)}/\p∈{q1i,q1k}}.

This holds for the fourth term.

Here, K is a positive number satisfying 0≤K≤1 and is set by the user in a process S1302. In addition, K is for weighting when the similarity between the question text and the answer text is reflected in the score S. This makes it possible to weight each part of the context. It is desirable to weight the similarity of the answer text with K>0.5, considering the knowledge of the above (1). As can be seen from the above description, as the value of the first term+the second term on the right side becomes larger, the possibility that syn12 and syn22 will be defined as synonyms becomes higher.

Then, the third and fourth terms on the right side are for the above (2). Here, L is a positive number satisfying 0≤L≤1 and is set by the user in the process S1302. In addition, f1(q, syn1, syn2) is a function that outputs a sentence obtained by substituting the headword having syn1 in a question text q as a synonym with syn2. Further, f2(q) is a function that outputs a set of question texts having the answer text of q as an answer.

According to the above definition, q∈Q1−{f2(q1)} of the third term on the right side is a question text (an answer text that does not have the answer text of q1 as an answer) other than the question text having the answer text of q1 as an answer among the question texts included in Q1. In addition, max{sim(q1, f1(q, syn11, syn12)) determines the maximum value of the similarity between q1 and a sentence obtained by substituting the question text that does not have the answer text of q1 as an answer with a synonym. These question texts are not similar since the answers are different. Therefore, the third term on the right side acts as a penalty term. In addition, L is a weight for the penalty term. The third term on the right side is for the dialogue data 1 and the fourth term on the right side is similarly for the dialogue data 2.

Finally, the score S is compared with the threshold value set by the user in the process S1302 and it is determined whether to register the synonym candidates syn12 and syn22 as synonyms on the basis of the comparison result. In a case in which it is determined that the synonym candidates syn12 and syn22 are synonyms, they are included and registered in a synonym set in the dictionary from which the dialogue data 1 and the dialogue data 2 have been acquired, for example, the case dictionary 153.

FIG. 17 illustrates an example in which, in dialogue data, the similarity of an answer text is more correlated with the determination of whether or not the synonym candidate is a synonym than the similarity of a question text. Here, synonym candidates are extracted from four domain dictionaries 152. Here, there are the following synonym candidates of "number" and only the synonym candidates in (1) and (6) are synonyms:

(1) "Car registration number" and "number plate";
(2) "Car registration number" and "my number";
(3) "Car registration number" and "personal number";
(4) "Number plate" and "my number";
(5) "Number plate" and "personal number"; and
(6) "My number" and "personal number".

FIG. 18 is a table illustrating the relationship among the similarity of a question text, the similarity of an answer text, and synonym determination in the example illustrated in FIG. 17. A weight for the similarity of the answer text is greater than that for the similarity of the question text. Therefore, while (4) Q2-Q3 and (5) Q2-Q4 in which only the similarity of the question text is high are determined not to be synonyms and (1) Q1-Q2 in which only the similarity of the answer text is high is determined to be a synonym.

In a case in which the similarity of the question text or the answer text is high and the question text and the answer text are displayed side by side as illustrated in FIG. 17 together with the display of FIG. 18, the user easily performs evaluation. In addition, in a case in which the question text is similar and the answer text has a high percentage of dissimilarity, there is a possibility that appropriate synonym candidates will not be included. Therefore, for example, it is desirable that a warning is issued to attract the attention of the user.

As described in <4. Generalization of Knowledge in Knowledge Bank>, the synonym candidates are also evaluated by the user here. The generalization unit 141 displays, for example, a synonym candidate with a score equal to or greater than the threshold value set in the process S1302 to the user through the input/output device 13, using the calculated score S. At that time, the scores may be displayed and sorted.

In a case in which the user evaluates (1) "car registration number" and "number plate" and (6) "my number" and "personal number" to be True, True evaluation is recorded along with the type of dictionary in which the words are used, as illustrated in the first to eighth rows of FIG. 8C.

In this case, in the dictionary in which the words are used, "car registration number" and "number plate" may be registered as a new synonym pair for the headword <car registration number> and "my number" and "personal number" may be registered as a new synonym pair for the headword <my number>. In this way, it is possible to expand the synonym dictionary.

<6. Application of Knowledge in Knowledge Bank>

In the above description, the method that generalizes and expands knowledge in the knowledge bank and evolves the synonym dictionary has been described. Next, a process that apples the knowledge in the knowledge bank generated in this way to the actual sentences to substitute synonyms will be described. Whether synonyms have the same meaning depends on the context. Therefore, whether a set of synonyms is appropriate as synonyms in a specific context needs to be checked on the basis of whether the synonyms are matched with the context, which results in an increase in cost. In a case in which synonyms of the upper-layer general-purpose dictionary in the knowledge bank are applied, it is difficult to always perform appropriate substitution without a manual check.

Figure 19:
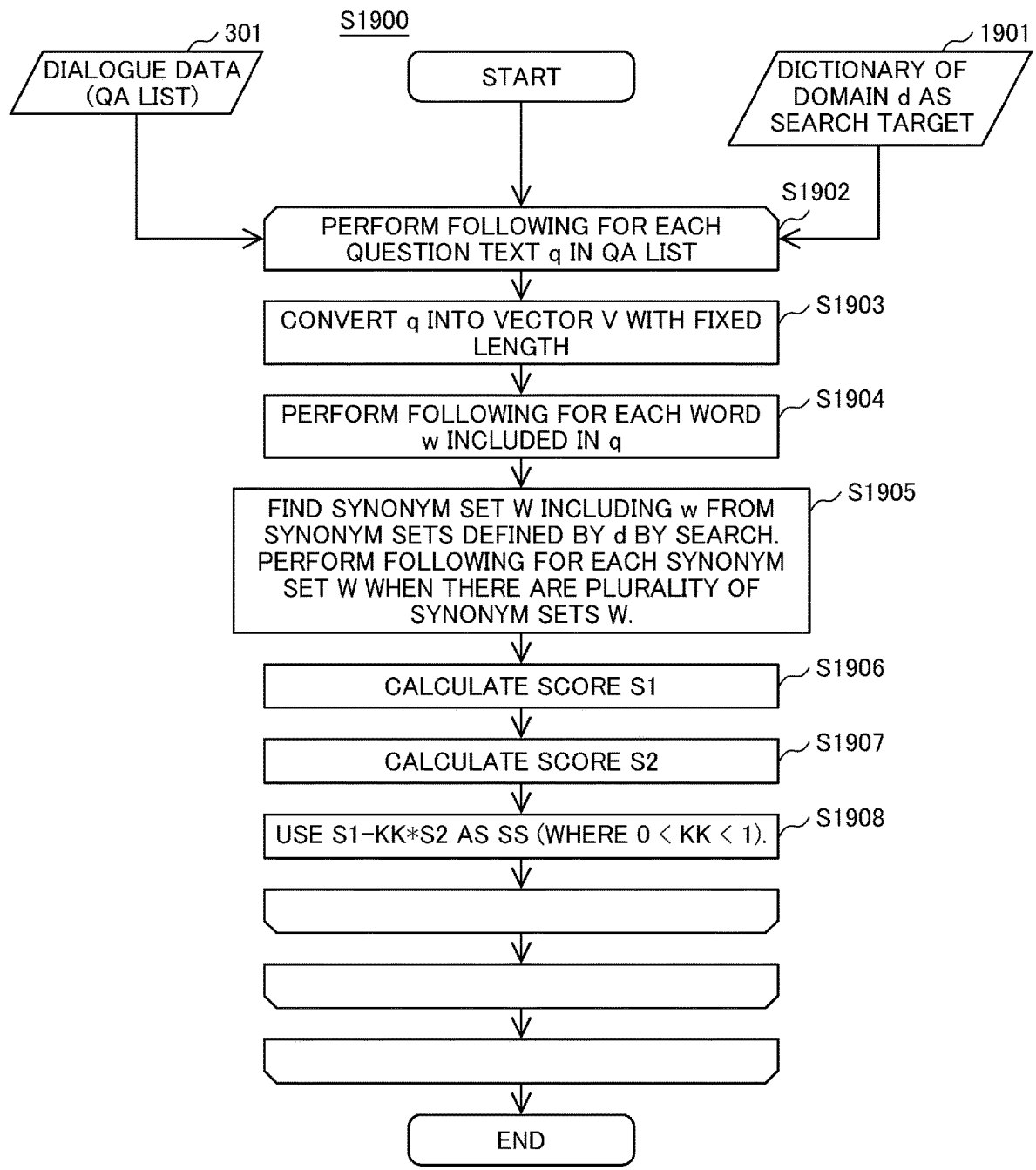
FIG. 19 is a flowchart illustrating the flow of an application process.

FIG. 19 is a flowchart illustrating the flow of an application process according to this embodiment. An application process S1900 can be used for a part or all of the generation process S302 illustrated in FIG. 3.

The dialogue data 301 in which synonyms are be substituted, for example, a Q & A list is input to the generation unit 142 (the dialogue data 301 of the D bank illustrated in FIG. 3). It is assumed that a set of question texts is Q and a question text is q in the Q & A list. In addition, the dictionary data of the domain d to be searched (for example, the financial domain dictionary 152 in FIG. 3), that is, a synonym set is input. The generation unit 142 outputs a set of pairs of synonym sets W and the scores SS of the synonym sets W for each question text q in the Q & A list. Processes S1903 to S1908 are performed for each question text q in the Q & A list (S1902). First, the question text q is converted into a fixed-length vector V (S1903). Processes S1905 to S1908 are performed for each word w included in the question text q (S1904).

A synonym set W including each word w is obtained by search (S1905). It is assumed that the search target is a synonym set of a dictionary defined by d. In a case in which there are a plurality of synonym sets W, processes S1906 to S1908 are performed for each synonym set W.

The generation unit 142 calculates a score S1 (S1906), calculates a score S2 (S1907), and sets S1−KK*S2 as the score SS (S1908). Each process will be described in detail below.

In the calculation of the score S1 (S1906), the generation probability of a fixed-length vector V of the question text q in a context distribution WC=(AVE, VAR) of the text in which elements of the synonym set W appear is calculated as S1 ($0 \leq S1 \leq 1$).

FIG. 20 is a detailed flowchart illustrating the calculation of the score S1 (S1906). The input is a synonym set 2001 W={w1, w2, . . . } and the output is the generation probability of a question text vector in the context distribution WC of the text in which elements w1, w2, . . . of the synonym set W appear.

First, a set of questions in which any words w1, w2, . . . of the synonym set W appear is searched from the Q & A list and is defined as Q={q1, q2, . . . } (S2002).

Then, each element of Q is converted into a fixed-length vector and the vector is defined as QV={qv1, qv2, . . . } (S2003). For example, a vectorization method converts each word of a question text q into a fixed-length vector using a word embedding learning method which is called word2vec and averages the vectors. Alternatively, a question text q may be directly converted into a fixed-length vector using a sentence vectorization method which is called doc2vec.

Then, the average vector AVE and the covariance matrix VAR of QV are calculated and the context distribution WC=(AVE, VAR) is obtained (S2004). The generation probability of a fixed-length vector V of the question text q in the context distribution WC is calculated as the score S1 (S2005).

The score S1 indicates the relationship between the question text q and a sentence in which a synonym of a word in the question text q is used. This configuration is characterized in that the probability is calculated from the distribution (mean and variance) of the context (that is, sentence) in which words in the synonym set are used. For example, in a case in which the sentences in which the words in the synonym set are used are almost the same, the question text q is close to the sentences. In this case, since the variance is small, the target q is slightly different from the average and the generation probability S1 is reduced. Conversely, in a case in which the sentences in which the words in the synonym set are used are not similar to each other, there is a possibility that synonyms will be developed in any sentence. In this case, since the variance is large, the generation probability S1 is high even though there is a little deviation from the average.

Therefore, in a case in which the score S1 is large, it is highly likely that the synonym set W is appropriate to be applied to the question text q. In a case in which the score S1 is small, it is highly likely that the synonym set W is not appropriate to be applied to the question text q. For the calculation of the score S1, only the question text may be processed in the Q & A.

In the calculation of the score S2 (S1907), it is assumed that a sentence obtained by performing synonym development (substitution) for the question text q with each synonym w in the synonym set W is defined as q'. Then, another question text that is most similar to q' (has an answer text different from the answer text to q) is searched and the similarity of the searched question text is defined as S2 ($0 \leq S2 \leq 1$). Here, S2=max{sim(q', q")} is established (where q' is a sentence obtained by substituting q with w∈ and q"∈Q−{a2q(q2a(q))} is established. In addition, q2a(x) is a function that output an answer text having x as a question text and a2q(x) is a function that outputs a question text having x as an answer text. That is, q" is a question text having an answer different from the answer to q. In a case in which there are a plurality of synonyms w in the synonym set W, there are also a plurality of q's. Therefore, the score S2 has the maximum value max of the similarity.

The intention of the score S2 is to reflect, in the score, the risk that a question text will be similar to a question having another answer after synonym development. Since the question having another answer is naturally a question having another meaning, a synonym set that causes the question texts to be rephrased so as to be similar to each other needs to be deleted from the candidates. Therefore, the score S2 acts as a penalty term.

Finally, S1−KK*S2 is calculated as SS (S1908). However, KK satisfies $0 \leq KK \leq 1$. Here, KK is a weight for the penalty term and may be arbitrarily set by the user. Finally, the question text q, the synonym set W, and the score SS are output.

In the example illustrated in FIG. 19, the calculation of the score S1 and the calculation of the score S2 are sequentially performed. However, in a case in which the score S1 is not greater than the predetermined threshold value, the process after the calculation of the score S2 may be omitted and the synonym set W may be deleted from the candidates.

FIG. 21 illustrates an example of a screen on which the result of the application process S1900 is displayed and which is displayed on the input/output device 13 and allows the user to perform evaluation. The synonym set W and the score SS thereof are illustrated for each question text q in the Q & A list.

The question text 707 and the answer text 708 in the Q & A of the D bank are displayed on the right side of the screen. The domain of the D bank is displayed in the domain display field 709. The synonym set W to be evaluated is displayed on the left side of the screen and the score SS is presented in the score field 710 for referring to whether or not this synonym set is appropriate for the Q & A on the right side. The user can input the final evaluation into the evaluation field 711 with reference to the score field 710. The evaluation result is the evaluation result of the knowledge of the D bank and is recorded as log data. When the synonym set is appropriate for the Q & A, synonym development can be performed for the text using the synonym set (dictionary). Alternatively, a new dictionary can be created by collecting synonym sets that have been evaluated to be appropriate.

In this case, the synonym set W including "application", "notification", and "submission" is evaluated to be applicable to a Q & A including a question text "Which documents are required for <application>?" in the first row on the right side of FIG. 21 and is evaluated not to be applicable to a Q & A including a question text "Where can I go for <application>?". Therefore, elements of the synonym set W are evaluated to be true or false for each Q & A.

It is also possible to simultaneously correct the synonym sets which are presented on the left side of the screen and are used for the Q & A evaluated to be true. In the example illustrated in FIG. 21, "notification" and "submission" have been evaluated to be false and excluded from the synonym set. In addition, the user can also add new synonyms on the spot. In the example illustrated in FIG. 21, "declaration" is newly added.

In the first to fourth rows in FIG. 8D, the result of the user's evaluation in the application is recorded on log data. It is determined whether or not the synonym set of the headword is further applicable to the Q & A to which the headword <application> can be applied. In addition, the added "declaration" is evaluated to be true. The evaluation result is separately recorded for a set of the Q & A and the synonym set W in the evaluation field 711.

The coverage rate and the error rate described in <4. Generalization of Knowledge in Knowledge Bank> may be reflected in the score S1 indicating the generation probability of the question text. For example, the coverage rate and the error rate are converted into a single score by any method. For example, the coverage rate and the error rate are simply averaged to calculate a score as follows:

Score=(coverage rate+(1−error rate))/2.

Then, the score is given to each synonym set. The score S1 can be multiplied by the above score and S1*score can be used as a new index instead of the score S1.

What is claimed is:

1. An information processing method performed in an information processing apparatus including an input device, an output device, a processing device, a storage device, and an inference unit,
wherein the inference unit performs:
a first step of inputting first text data including a set of a first question text and a first answer text and second text data including a set of a second question text and a second answer text; and
a second step of, in a case in which a first synonym relationship in which a word A in the first text data is capable of being substituted with a word B is established and a second synonym relationship in which the word A in the second text data is capable of being substituted with a word C is established, calculating a similarity between the word B and the word C from a first similarity between the first answer text and the second answer text and a second similarity between the first question text and the second question text, and a contribution rate of the first similarity is different from a contribution rate of the second similarity in the calculation,
wherein the first text data and the first synonym relationship are acquired from a first database,
the second text data and the second synonym relationship are acquired from a second database, and
wherein the method further comprises:
a third step of acquiring first reference text data other than the first text data from the first database and substituting the word A of a question text in the first reference text data with the word C to generate a first substituted question text;
a fourth step of searching for a first substituted question text which is most similar to the first question text and has an answer text different from the first answer text from the first reference text data; and
a fifth step of calculating a similarity between the first question text and the first substituted question text as a first penalty score.

2. The information processing method according to claim 1,
wherein the contribution rate of the first similarity is greater than the contribution rate of the second similarity.

3. The information processing method according to claim 1,
wherein, in the second step, the first text data and the second text data are vectorized to calculate the first similarity and the second similarity.

4. The information processing method according to claim 1, further comprising:
a sixth step of acquiring second reference text data other than the second text data from the second database and substituting the word A of a question text in the second reference text data with the word B to generate a second substituted question text;
a seventh step of searching for a second substituted question text which is most similar to the second question text and has an answer text different from the second answer text from the second reference text data; and
an eighth step of calculating a similarity between the second question text and the second substituted question text as a second penalty score.

5. The information processing method according to claim 1,
wherein a score for evaluating the similarity between the word B and the word C is generated, using the first similarity and the second similarity as positive parameters and the first penalty score and the second penalty score as negative parameters.

6. The information processing method according to claim 1,
wherein the first similarity and the second similarity are displayed to a user.

7. An information processing apparatus comprising:
an input device;
an output device;
a processing device;
a storage device; and
an inference unit,
wherein the inference unit has:
a first function of inputting first text data including a set of a first question text and a first answer text and second text data including a set of a second question text and a second answer text; and a second function of, in a case in which a first synonym relationship in which a word A in the first text data is capable of being substituted with a word B is established and a second synonym relationship in which the word A in the second text data is capable of being substituted with a word C is established, calculating a similarity between the word B and the word C from a first similarity between the first answer text and the second answer text and a second similarity between the first question text and the second question text, and a contribution rate of the first similarity is different from a contribution rate of the second similarity in the calculation, wherein the first text data and the first synonym relationship are acquired from a first database, wherein the second text data and the second synonym relationship are acquired from a second database, and wherein the interface unit further has:

a third function of acquiring first reference text data other than the first text data from the first database and substituting the word A of a question text in the first reference text data with the word C to generate a first substituted question text;

a fourth function of searching for a first substituted question text which is most similar to the first question text and has an answer text different from the first answer text from the first reference text data; and a fifth function of calculating a similarity between the first question text and the first substituted question text as a first penalty score.

8. The information processing apparatus according to claim 7, wherein the contribution rate of the first similarity is greater than the contribution rate of the second similarity.

9. The information processing apparatus according to claim 7, wherein, in the second function, the first text data and the second text data are vectorized to calculate the first similarity and the second similarity.

10. The information processing apparatus according to claim 7, further comprising:

a sixth function of acquiring second reference text data other than the second text data from the second database and substituting the word A of a question text in the second reference text data with the word B to generate a second substituted question text;

a seventh function of searching for a second substituted question text which is most similar to the second question text and has an answer text different from the second answer text from the second reference text data; and an eighth function of calculating a similarity between the second question text and the second substituted question text as a second penalty score.

11. The information processing apparatus according to claim 7, wherein a score for evaluating the similarity between the word B and the word C is generated, using the first similarity and the second similarity as positive parameters and the first penalty score and the second penalty score as negative parameters.

* * * * *